US007465404B2

(12) United States Patent
Baek et al.

(10) Patent No.: US 7,465,404 B2
(45) Date of Patent: *Dec. 16, 2008

(54) INK-JET PRINTHEAD AND METHOD FOR MANUFACTURING THE SAME

(75) Inventors: Seog-soon Baek, Suwon (KR); Yong-soo Oh, Seongnam (KR); Keon Kuk, Yongin (KR); Ki-deok Bae, Yongin (KR); Seung-ju Shin, Seongnam (KR); Su-ho Shin, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 421 days.

This patent is subject to a terminal disclaimer.

(21) Appl. No.: 11/285,365

(22) Filed: Nov. 23, 2005

(65) Prior Publication Data

US 2006/0071976 A1 Apr. 6, 2006

Related U.S. Application Data

(62) Division of application No. 10/691,588, filed on Oct. 24, 2003, now Pat. No. 6,979,076.

(30) Foreign Application Priority Data

Oct. 24, 2002 (KR) ............................... 2002-65184

(51) Int. Cl.
*G01D 15/00* (2006.01)

(52) U.S. Cl. ............................. 216/27; 216/58; 216/74; 216/79

(58) Field of Classification Search ................... 216/27, 216/58, 74, 79
See application file for complete search history.

(56) References Cited

U.S. PATENT DOCUMENTS

| | | | |
|---|---|---|---|
| 4,275,290 | A | 6/1981 | Cielo et al. |
| 4,639,748 | A | 1/1987 | Drake et al. |
| 5,502,471 | A | 3/1996 | Obermeier et al. |
| 5,565,084 | A | 10/1996 | Lee et al. |
| 5,734,399 | A | 3/1998 | Weber et al. |
| 5,841,452 | A | 11/1998 | Silverbrook |
| 5,855,835 | A | 1/1999 | Gordon et al. |
| 5,859,654 | A | 1/1999 | Radke et al. |
| 5,880,759 | A | 3/1999 | Silverbrook |

(Continued)

FOREIGN PATENT DOCUMENTS

EP 0 924 077 6/1999

(Continued)

*Primary Examiner*—Binh X Tran
(74) *Attorney, Agent, or Firm*—Lee & Morse, P.C.

(57) ABSTRACT

An ink-jet printhead includes a substrate on which an ink chamber to be supplied with ink to be ejected is formed on a front surface of the substrate, a manifold for supplying ink to the ink chamber is formed on a rear surface of the substrate, and an ink passage in communication with the ink chamber and the manifold is formed parallel to the front surface of the substrate, a nozzle plate formed on the front surface of the substrate, a nozzle formed through the nozzle plate through which ink is ejected from the ink chamber, a heater formed on the nozzle plate, and an electrode electrically connected to the heater for applying current to the heater.

15 Claims, 9 Drawing Sheets

U.S. PATENT DOCUMENTS

| | | | | |
|---|---|---|---|---|
| 6,019,457 | A | 2/2000 | Silverbrook | |
| 6,102,530 | A * | 8/2000 | Kim et al. | 347/65 |
| 6,260,957 | B1 | 7/2001 | Corley, Jr. et al. | |
| 6,286,941 | B1 | 9/2001 | Courian et al. | |
| 6,336,714 | B1 | 1/2002 | Kawamura et al. | |
| 6,382,782 | B1 | 5/2002 | Anagnostopoulos et al. | |
| 6,402,972 | B1 | 6/2002 | Weber et al. | |
| 6,412,918 | B1 | 7/2002 | Chen et al. | |
| 6,423,241 | B1 | 7/2002 | Yoon et al. | |
| 6,533,399 | B2 | 3/2003 | Lee et al. | |
| 6,561,625 | B2 | 5/2003 | Maeng et al. | |
| 6,561,626 | B1 | 5/2003 | Min et al. | |
| 2002/0129495 | A1 * | 9/2002 | Trueba et al. | 29/890.01 |
| 2002/0149650 | A1 | 10/2002 | Cruz-Uribe et al. | |
| 2003/0085957 | A1 | 5/2003 | Huang et al. | |
| 2003/0160842 | A1 | 8/2003 | Min et al. | |
| 2006/0146102 | A1 * | 7/2006 | Kim et al. | 347/85 |

FOREIGN PATENT DOCUMENTS

| | | |
|---|---|---|
| EP | 1 174 268 | 1/2002 |
| EP | 1 215 048 | 6/2002 |
| EP | 1 216 837 | 6/2002 |
| EP | 1 221 374 | 7/2002 |
| EP | 1 226 946 | 7/2002 |
| EP | 1 413 438 | 4/2004 |
| JP | 2002-36562 | 2/2002 |

* cited by examiner

INK-JET PRINTHEAD AND METHOD FOR MANUFACTURING THE SAME

CROSS REFERENCE TO RELATED APPLICATION(S)

This is a divisional application based on application Ser. No. 10/691,588, filed Oct. 24, 2003, now U.S. Pat. No. 6,979,076, the entire contents of which is hereby incorporated by reference.

BACKGROUND OF THE INVENTION

1. Field of the Invention

The present invention relates to an ink-jet printhead, and a method for manufacturing the same, in which an ink passage is formed parallel to a surface of a substrate on a same plane as an ink chamber using an etch method to improve performance of the printhead.

2. Description of the Related Art

In general, ink-jet printheads are devices for printing a predetermined image, color or black, by ejecting a small volume droplet of a printing ink at a desired position on a recording sheet. Ink ejection mechanisms of an ink-jet printhead are largely categorized into two different types: an electro-thermal transducer type (bubble-jet type), in which a heat source is employed to form and expand a bubble in ink thereby causing an ink droplet to be ejected, and an electro-mechanical transducer type, in which an ink droplet is ejected by a change in volume in ink due to a deformation of a piezoelectric element.

An ink droplet ejection mechanism of a thermal ink-jet printhead will now be described in detail. When a pulse current flows through a heater formed of a resistive heating material, heat is generated by the heater. The heat causes ink near the heater to be rapidly heated to approximately 300° C., thereby boiling the ink and generating a bubble in the ink. The formed bubble expands and exerts pressure on ink contained within an ink chamber. This pressure causes a droplet of ink to be ejected through a nozzle from the ink chamber.

A thermal driving method includes a top-shooting method, a side-shooting method, and a back-shooting method depending on the direction in which the ink droplet is ejected and the direction in which a bubbles expands. The top-shooting method is a method in which the growth direction of a bubble is the same direction as the ejection direction of an ink droplet. The side-shooting method is a method in which the growth direction of a bubble is perpendicular to the ejection direction of an ink droplet. The back-shooting method is a method in which the growth direction of a bubble is opposite to the ejection direction of an ink droplet.

An ink-jet printhead using the thermal driving method should satisfy the following requirements. First, manufacturing of the ink-jet printhead has to be simple, costs have to be low, and mass production thereof has to be possible. Second, in order to obtain a high-quality image, crosstalk between adjacent nozzles has to be suppressed and an interval between adjacent nozzles has to be narrow, that is, a plurality of nozzles should be densely arranged to improve dots per inch (DPI). Third, in order to perform a high-speed printing operation, a period in which the ink chamber is refilled with ink after ejection of an ink droplet from the ink chamber has to be as short as possible. That is, heated ink has to be quickly cooled to increase a driving frequency.

FIG. 1 illustrates a perspective view of a structure of a conventional ink-jet printhead using a back-shooting method. Referring to FIG. 1, an ink-jet printhead 24 includes a substrate 11 on which a nozzle 10 through which ink droplets are ejected, and an ink chamber 16 to be supplied with ink to be ejected are formed, a cover plate 3 in which a through hole 2 for providing communication between the ink chamber 16 and an ink reservoir 12 is formed, and the ink reservoir 12 for supplying ink to the ink chamber 16. The substrate 11, the cover plate 3, and the ink reservoir 12 are sequentially stacked. In addition, a heater 42 is arranged in a ring shape around the nozzle 10 of the substrate 11.

In the above structure, when pulse current is supplied to the heater 42 and heat is generated by the heater 42, ink in the ink chamber 16 is boiled, and bubbles are generated and continuously expand. Due to this expansion, pressure is applied to ink filling the ink chamber 16 such that ink droplets are ejected through the nozzle 10. Subsequently, ink flows into the ink chamber 16 through the through hole 2 formed in the cover plate 3 from the ink reservoir 12. Thus, the ink chamber 16 is refilled with ink.

In this ink-jet printhead, however, a depth of the ink chamber 16 is almost the same as a thickness of a substrate 11. Thus, unless a very thin substrate is used, the size of the ink chamber increases. Accordingly, pressure generated in bubbles to be used to eject ink is dispersed by ambient ink, which lowers an ejection property. When a thin substrate is used to reduce the size of the ink chamber, it becomes more difficult to process the substrate. That is, a depth of an ink chamber, which is generally used in an ink-jet printhead, is about 10-30 μm. In order to form an ink chamber having that depth, a silicon substrate having a thickness of 10-30 μm should be used. It is virtually impossible, however, to process a silicon substrate having such a thickness in a semiconductor manufacturing process.

Further, in order to manufacture an ink-jet printhead having the above structure, a cover plate and an ink reservoir are bonded together. Thus, a process of manufacturing such an ink-jet printhead becomes complicated, and an ink passage, which affects an ejection property, cannot be elaborately formed.

FIG. 2 illustrates a cross-sectional view of a structure of a conventional ink-jet printhead using a back-shooting method. Referring to FIG. 2, an ink chamber 15 having a hemispherical shape is formed on a substrate 30 formed of silicon. A manifold 26 for supplying ink to an ink chamber 15 is formed below the ink chamber 15. An ink channel 13 for providing communication between the ink chamber 15 and the manifold 26 is formed between the ink chamber 15 and the manifold 26 in a cylindrical shape perpendicular to a surface of the substrate 30. A nozzle plate 20, in which a nozzle 21 through which ink droplets 18 are ejected is formed, is placed on the surface of the substrate 30 and forms an upper wall of the ink chamber 15. A ring-shaped heater 22 is formed in the nozzle plate 20, adjacent to the nozzle 21, and surrounds the nozzle 21. An electric line (not shown) for applying current is connected to the heater 22.

In the above structure, ink supplied through the manifold 26 and the ink channel 13 fills the ink chamber 15. In this state, when pulse current is applied to the ring-shaped heater 22, ink below the heater 22 is boiled by heat generated by the heater 22, and bubbles are generated. As a result, pressure is applied to ink within the ink chamber 15, and ink in the vicinity of the nozzle 21 is ejected in the shape of an ink droplet 18 through the nozzle 21. Subsequently, ink flows into the ink chamber 15 through the ink channel 13, thereby refilling the ink chamber 15 with ink.

In such an ink-jet printhead, only part of a substrate is etched to form an ink chamber. Thus, a size of the ink chamber can be reduced. In addition, such a printhead is manufactured by an overall process without a bonding process. Thus, a process of manufacturing an ink-jet printhead having such a configuration is relatively simple.

In this configuration, however, the ink channel is placed in a straight line with the nozzle. Thus, when bubbles are generated, ink flows back toward the ink channel, thereby lowering an ejection property. In addition, the substrate exposed by the nozzle is etched to form the ink chamber. Accordingly, although the size of the ink chamber can be reduced, an ink chamber having a certain shape cannot be manufactured. Thus, it is difficult to manufacture an ink chamber having an optimum shape.

FIG. 3 schematically illustrates a cross-sectional view a structure of another conventional ink-jet printhead using a back-shooting method. Referring to FIG. 3, an ink-jet printhead includes a nozzle plate 50 in which a nozzle 51 is formed, an insulating layer 60 in which an ink chamber 61 and an ink channel 62 are formed, and a silicon substrate 70 on which a manifold 55 for supplying ink to the ink chamber 61 is formed. The nozzle plate 50, the insulating layer 60, and the silicon substrate 70 are sequentially stacked.

In such an ink-jet printhead, the ink chamber 61 is formed using the insulating layer 60 stacked on the substrate 70 such that the shape of the ink chamber 61 can be varied and the back flow of ink can be prevented.

In the manufacture of this ink-jet printhead, however, in general, a thick insulating layer is deposited on a silicon substrate and etched, thereby forming an ink chamber. Such a method has the following problems: first, it is difficult to stack a thick insulating layer on a substrate in a semiconductor manufacturing process, and second, it is difficult to etch a thick insulating layer. Thus, in this ink-jet printhead, there is a limitation on the depth of the ink chamber. An ink chamber and a nozzle having a depth of about 6 μm are shown in FIG. 3. It is virtually impossible, however, to manufacture an ink-jet printhead having a comparatively large drop size using an ink chamber having this depth.

SUMMARY OF THE INVENTION

It is a feature of an embodiment of the present invention to provide an ink-jet printhead in which an ink passage is formed parallel to a surface of a substrate on a same plane as an ink chamber using an etch method to improve the performance of the printhead.

It is another feature of an embodiment of the present invention to provide a method for manufacturing the ink-jet printhead.

According to a feature of the present invention, there is provided an ink-jet printhead including a substrate on which an ink chamber to be supplied with ink to be ejected is formed on a front surface of the substrate, a manifold for supplying ink to the ink chamber is formed on a rear surface of the substrate, and an ink passage in communication with the ink chamber and the manifold is formed parallel to the front surface of the substrate, a nozzle plate formed on the front surface of the substrate, a nozzle formed through the nozzle plate through which ink is ejected from the ink chamber, a heater formed on the nozzle plate, and an electrode electrically connected to the heater for applying current to the heater. Preferably, the ink chamber, the manifold, and the ink passage are formed by an etch method.

Preferably, the ink passage is formed on a same plane as the ink chamber. Also preferably, the ink passage includes an ink channel in communication with the ink chamber; and a feed hole in communication with the ink channel and the manifold.

According to another feature of the present invention, there is provided a method for manufacturing an ink-jet printhead including forming a sacrificial layer having a predetermined depth on a front surface of a substrate, forming a nozzle plate on the front surface of the substrate on which the sacrificial layer is formed, arranging a heater and an electrode electrically connected to the heater on the nozzle plate, and exposing the sacrificial layer by forming a nozzle in the nozzle plate, forming a manifold on a rear surface of the substrate, forming an ink chamber and an ink passage by etching the sacrificial layer exposed through the nozzle, and providing communication between the manifold and the ink passage.

Preferably, forming the sacrificial layer includes forming a groove having a predetermined depth by etching the front surface of the substrate, forming an oxide layer having a predetermined thickness by oxidizing the front surface of the substrate in which the groove is formed, and filling a predetermined material in the groove formed in the oxide layer and planarizing the front surface of the substrate.

Preferably, filling the predetermined material in the groove formed in the oxide layer comprises epitaxially growing polysilicon and filling the grown polysilicon in the groove. Also preferably, providing communication between the manifold and the ink passage comprises etching the oxide layer formed between the manifold and the ink passage.

Alternately, forming the sacrificial layer may include forming a trench having a predetermined depth on a silicon on insulator (SOI) substrate, and filling the trench with a predetermined material. Preferably, the predetermined material is silicon oxide.

In the method for manufacturing an ink-jet printhead according to the present invention, a process of manufacturing an ink-jet printhead can be simplified.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
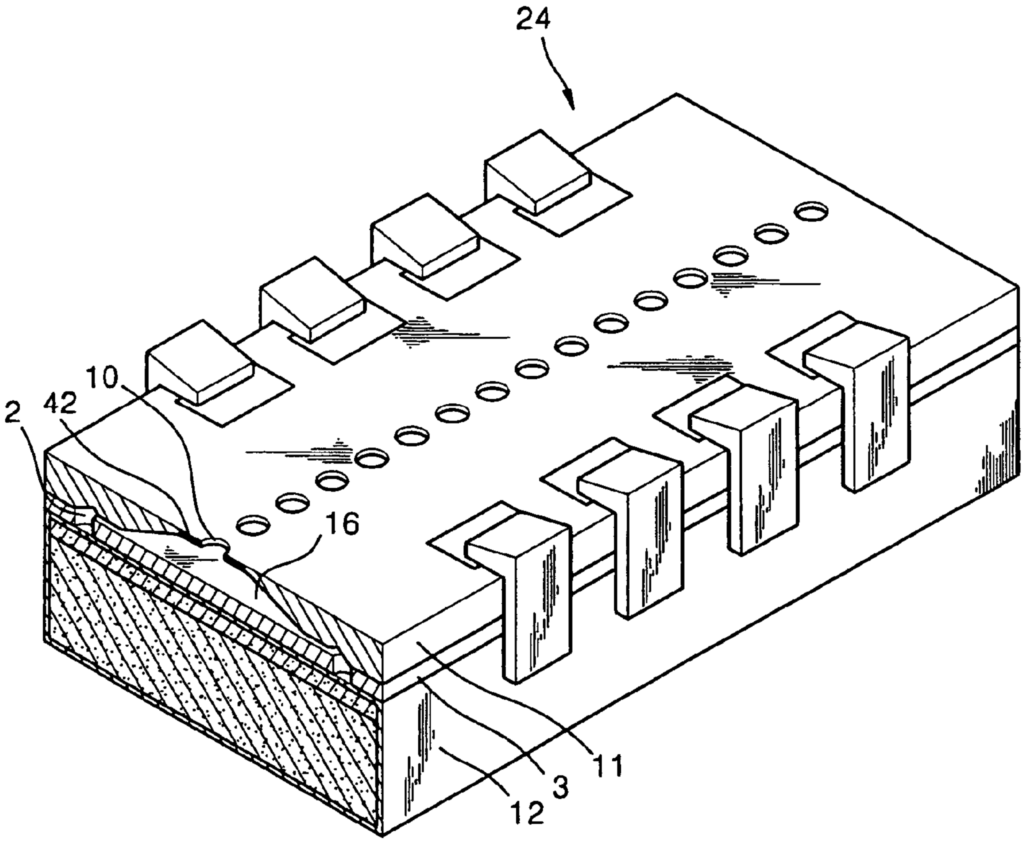
FIG. 1 (PRIOR ART)
FIG. 1 illustrates a plan view of a conventional ink-jet printhead.
Figure 2:
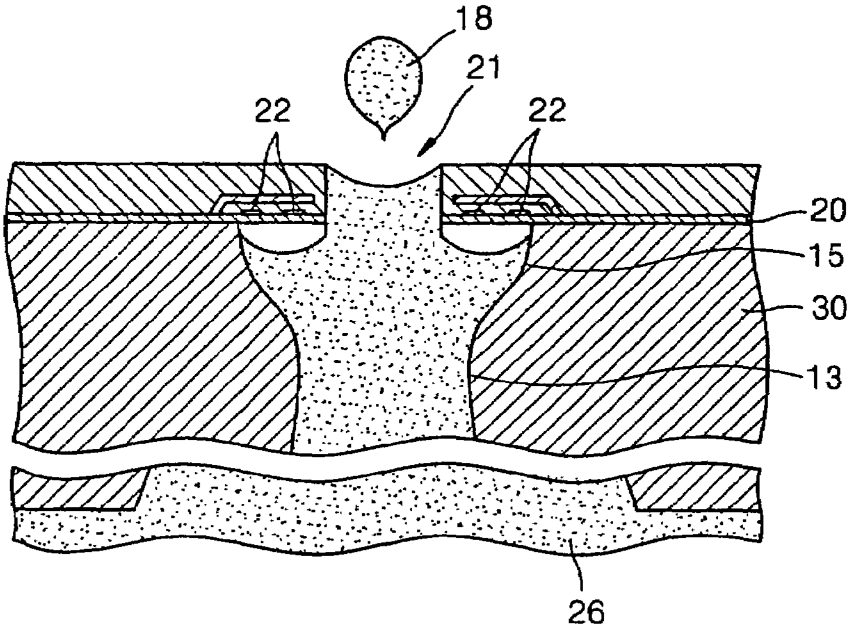
FIG. 2 (PRIOR ART)
FIG. 2 illustrates a perspective view of another conventional ink-jet printhead.
Figure 3:
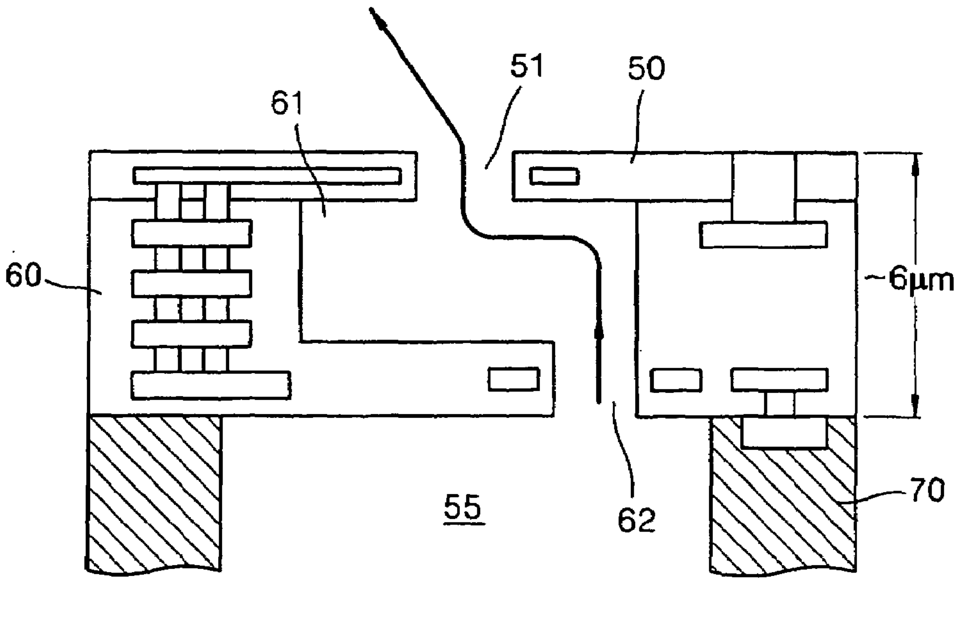
FIG. 3 (PRIOR ART)
FIG. 3 illustrates a perspective view of still another conventional ink-jet printhead.

Korean Patent Application No. 2002-65184, filed on Oct. 24, 2002, and entitled: “Ink-Jet Printhead and Method for Manufacturing the Same,” is incorporated by reference herein in its entirety.

The present invention will now be described more fully hereinafter with reference to the accompanying drawings, in which a preferred embodiment of the invention is shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions and the sizes of components may be exaggerated for clarity. It will also be understood that when a layer is referred to as being “on” another layer or substrate, it can be directly on the other layer or substrate, or intervening layers may also be present. Like reference numerals refer to like elements throughout.

Figure 4:
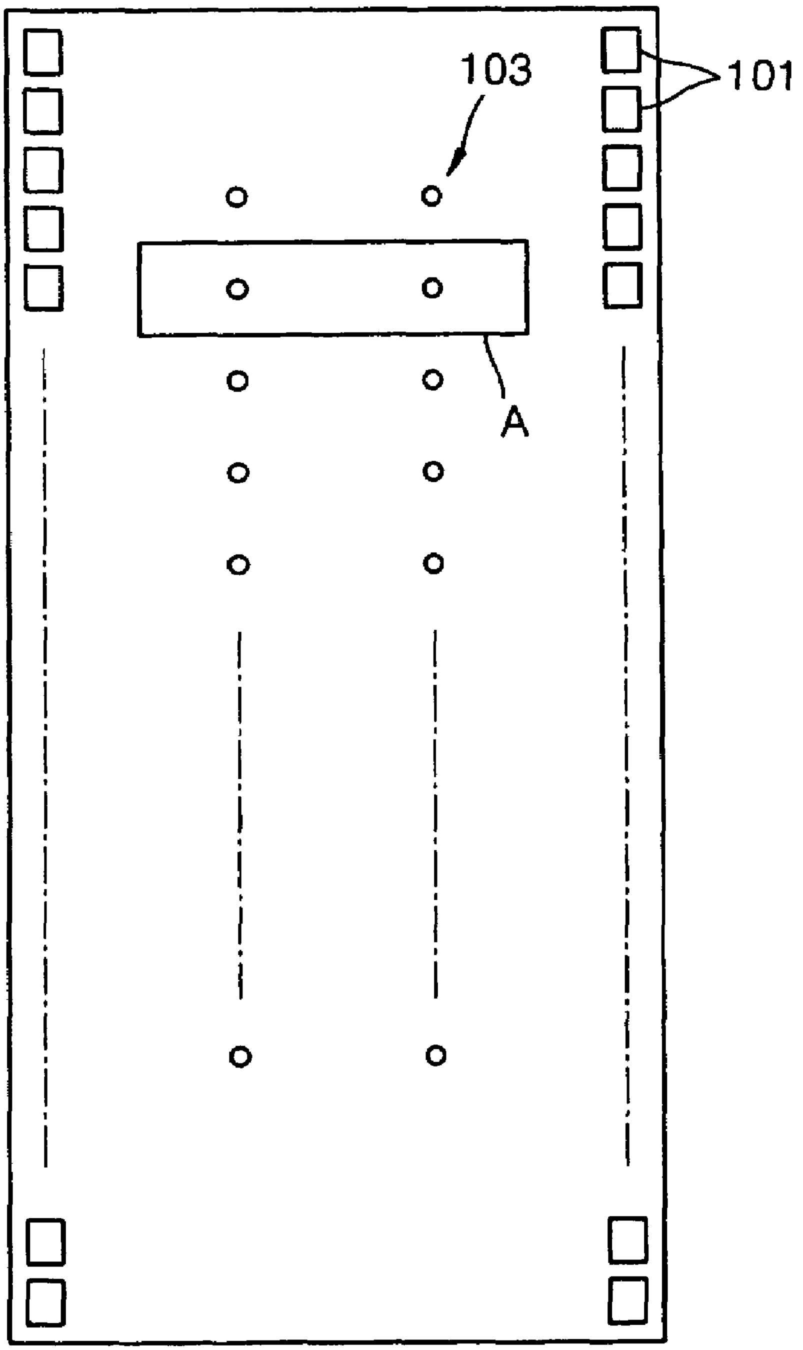
FIG. 4 schematically illustrates a plan view of a structure of an ink-jet printhead according to an embodiment of the present invention.

FIG. 4 schematically illustrates a plan view of the structure of an ink-jet printhead according to an embodiment of the present invention. Referring to FIG. 4, the ink-jet printhead includes ink ejecting portions 103 arranged in two rows and bonding pads 101, each of which are electrically connected to one of the ink ejecting portions 103. Although in the drawing the ink ejecting portions 103 are arranged in two rows, the ink ejecting portions 103 may be arranged in one row or in three or more rows to improve printing resolution.

Figure 5:
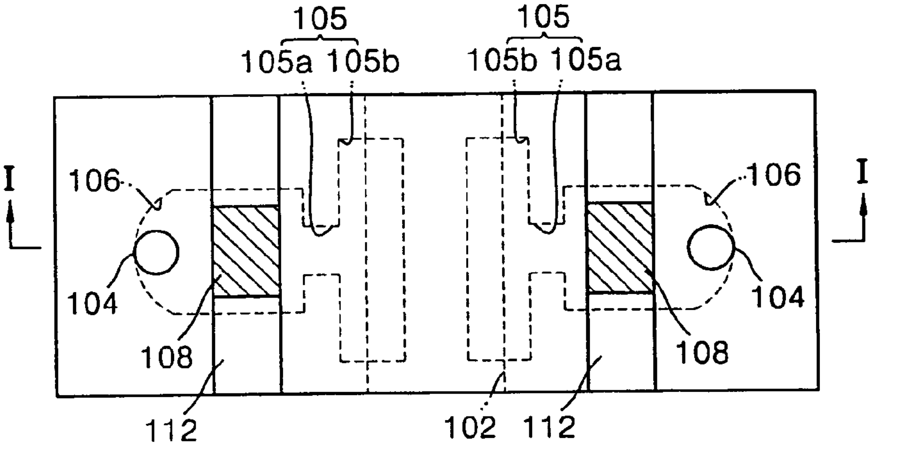
FIG. 5 illustrates a plan view of an enlarged portion A of FIG. 4.
Figure 6:
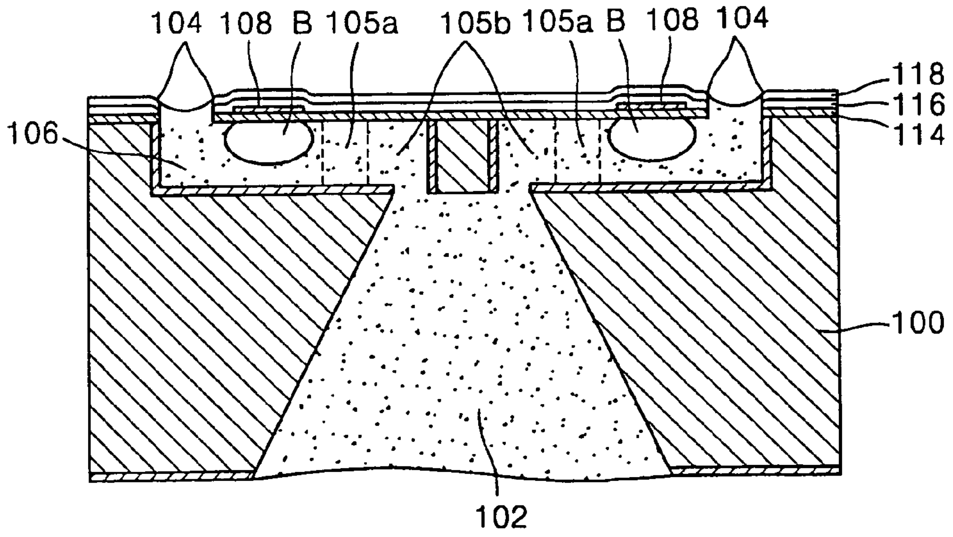
FIG. 6 illustrates a cross-sectional view of the vertical structure of the ink-jet printhead taken along line I-I of FIG. 5.
Figure 7:
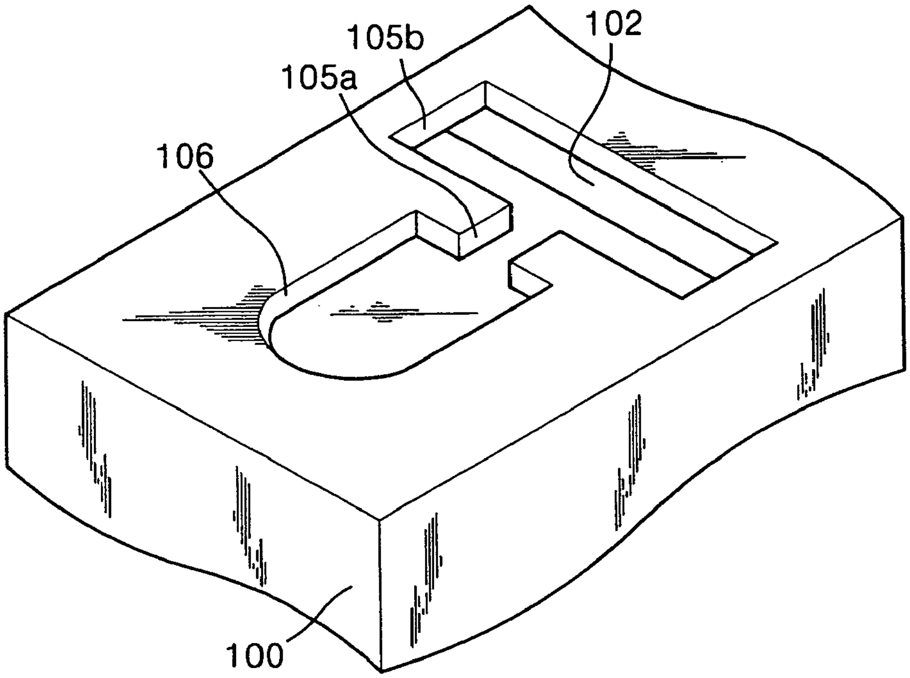
FIG. 7 illustrates a partial perspective view of a substrate on which an ink chamber and an ink passage are formed.

FIG. 5 illustrates a plan view of an enlarged portion A of FIG. 4. FIG. 6 illustrates a cross-sectional view of the vertical structure of the ink-jet printhead taken along line I-I of FIG. 5. FIG. 7 illustrates a partial perspective view of a substrate on which an ink chamber and an ink passage are formed.

Referring to FIGS. 5 through 7, an ink chamber 106 to be supplied with ink to be ejected is formed to a predetermined depth on a front surface of a substrate 100, and a manifold 102 for supplying ink to the ink chamber 106 is formed on a rear surface of the substrate 100.

The ink chamber 106 and the manifold 102 are formed by etching the front surface and rear surface of the substrate 100, respectively. Accordingly, their shapes may be varied. Preferably, the ink chamber 106 is formed to a depth of about 40 μm. The manifold 102 formed below the ink chamber 106 is in communication with an ink reservoir (not shown) in which ink is stored.

An ink passage 105 for providing communication with the ink chamber 106 and the manifold 102 is formed on the front surface of the substrate 100. The ink passage 105 is formed by etching the front surface of the substrate 100, as in the ink chamber 106. Accordingly, the shape of the ink passage 105 may be varied. The ink passage 105 is formed parallel to the front surface of the substrate 100 on a same plane as the ink chamber 106. The ink passage 105 includes an ink channel 105*a* and a feed hole 105*b*. The ink channel 105*a* is in communication with the ink chamber 106, and the feed hole 105*b* is in communication with the manifold 102. A plurality of ink channels 105*a* may be formed in consideration of an ejection property.

A nozzle plate 114 is formed on the substrate 100, on which the ink chamber 106, the ink passage 105, and the manifold 102 are formed. The nozzle plate 114 forms an upper wall of the ink chamber 106 and the ink passage 105. The nozzle 104, through which ink is ejected from the ink chamber 106, is formed in the nozzle plate 114. The nozzle plate 114 is a material layer for insulation between a heater 108 to be formed thereon and the substrate 100 and for passivating the heater 108. The nozzle plate 114 may be formed of silicon oxide or silicon nitride.

A heater 108 for generating bubbles B around the nozzle 104 is formed on the nozzle plate 114. A plurality of heaters 108 may be formed, and, although the drawing figures only illustrate an exemplary position and shape, the position or shape of the heater 108 may be varied. For example, the heater 108 may be formed in a ring shape to surround the nozzle 104. The heater 108 is formed of impurity-doped polysilicon or a resistive heating material, such as tantalum-aluminum alloy or tantalum nitride (TaN).

A heater passivation layer 116 is formed on the nozzle plate 114 and the heater 108. The heater passivation layer 116 is used to provide insulation between an electrode 112 to be formed thereon and the heater 108 and to passivate the heater 108. The heater passivation layer 116 may be formed of silicon oxide or silicon nitride, similar to the nozzle plate 114.

An electrode 112 electrically connected to the heater 108 for applying a pulse current to the heater 108 is formed on the heater passivation layer 116. A first end of the electrode 112 is connected to the heater 108, and a second end of the electrode 112 is connected to a bonding pad (101 of FIG. 4). The electrode 112 may be formed of metal of good conductivity, for example, aluminum or aluminum alloy. In addition, an electrode passivation layer 118 for passivating the electrode 112 is formed on the heater passivation layer 116 and the electrode 112.

In the above structure, ink supplied through the ink passage 105 from the manifold 102 fills the ink chamber 102. Subsequently, a pulse current is applied to the heater 108, heat generated by the heater 108 is transferred to ink below the heater 108 through the nozzle plate 114. As a result, ink is boiled, and bubbles B are generated in ink. As time passes, the bubbles B expand. Thus, due to pressure generated by the expanding bubbles B, ink in the ink chamber 106 is ejected through the nozzles 104. Subsequently, when the current is cut off, the bubbles B collapse, and ink refills the ink chamber 106.

During operation, the expanding bubbles B apply pressure to the ink passage 105, and thus, a back flow of ink may occur. In the ink-jet printhead according to an embodiment of the present invention, however, the ink passage 105 is formed parallel to the front surface of the substrate 100 on the same plane as the ink chamber 106, and thus, back flow of ink can be prevented.

In addition, the ink chamber 106 and the ink passage 105 are formed by an etch method, and thus, their shapes may be varied. Accordingly, the ink chamber 106 and the ink passage 105 having an optimum shape may be formed.

Hereinafter, a method for manufacturing an ink-jet printhead according to an embodiment of the present invention will be described. FIGS. 8 through 14 illustrate cross-sectional views of stages in a method for manufacturing an ink-jet printhead according to an embodiment of the present invention.

Figure 8:
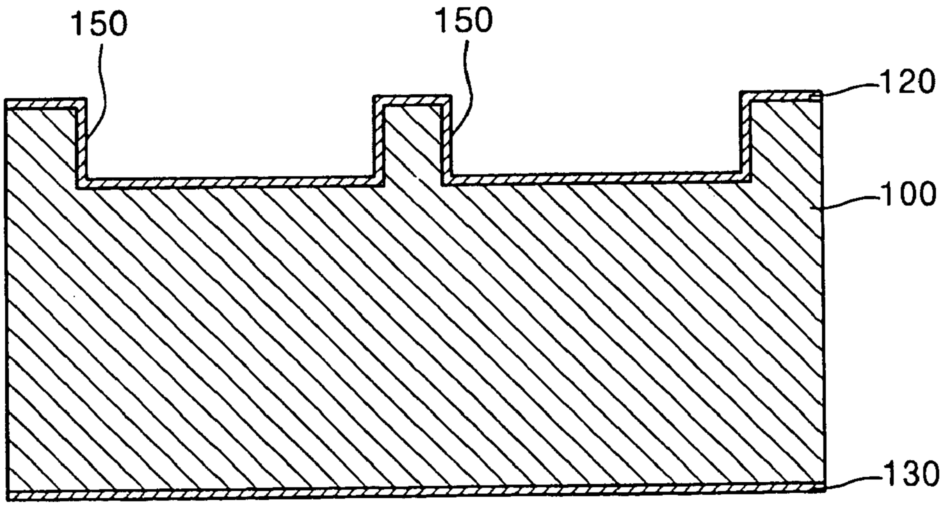
FIGS. 8 through 14 illustrate cross-sectional views of stages in a method for manufacturing an ink-jet printhead according to an embodiment of the present invention.

FIG. 8 illustrates a case where a groove 150 is formed on the front surface of a substrate 100 and an oxide layer 120 and 130 is formed on the front surface and the rear surface of the substrate, respectively, by oxidizing the substrate.

First, in the present embodiment, a silicon wafer processed to a thickness of about 300-700 μm is used as the substrate 100 because a silicon wafer that is widely used to manufacture semiconductor devices can be used without change, and thus facilitate mass production.

Only a very small part of a silicon wafer is actually shown in FIG. 8. The ink-jet printhead according to the present invention may be manufactured in the state of several tens to hundreds of chips on a wafer.

Next, the front surface of the silicon substrate 100 is etched, thereby forming a groove 150 having a predetermined shape. An ink chamber and an ink passage are to be later formed in the groove 150. Preferably, the depth of the groove 150 is about 40 μm. The groove 150 may be formed in various shapes according to an etch shape of the front surface of the substrate 100. As a result, an ink chamber and an ink passage having a desired shape can be formed.

Subsequently, the silicon substrate 100 on which the groove 150 is formed is oxidized, thereby forming silicon oxide layers 120 and 130 on the front surface and the rear surface of the substrate 100, respectively.

Figure 9:
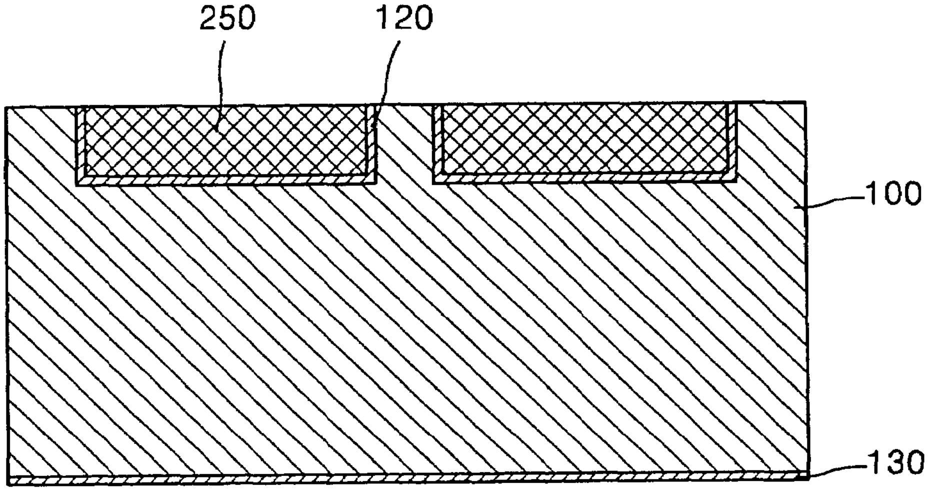

FIG. 9 illustrates a case where a sacrificial layer 250 is formed in the groove 150 formed on the substrate and the front surface of the substrate is planarized.

Specifically, polysilicon is grown in the groove 150 formed on the front surface of the oxidized substrate 100 by an epitaxial method, thereby forming a sacrificial layer 250 in the groove 150. Next, the front surface of the substrate 100 on which the sacrificial layer 250 is formed, is planarized by chemical mechanical polishing (CMP).

Figure 10:
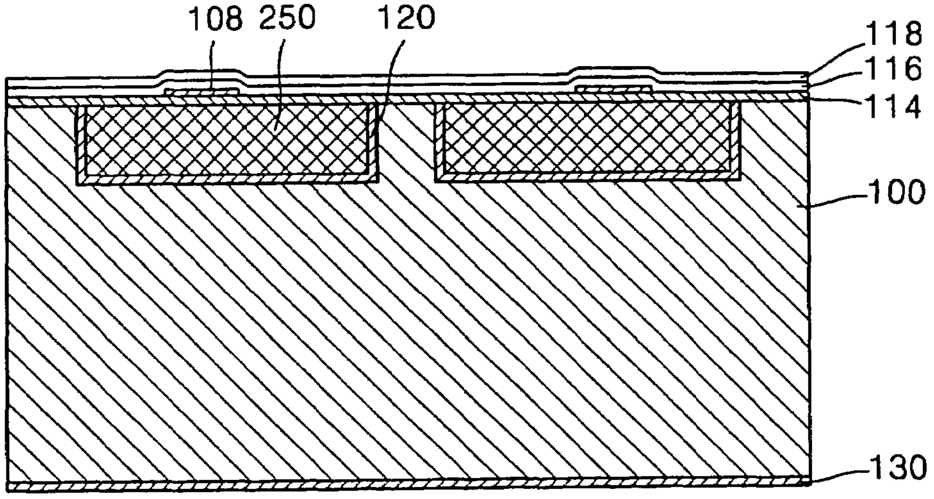

FIG. 10 illustrates a case where a nozzle plate 114 is formed on the front surface of the substrate 100 and a heater 108 and an electrode (112 of FIG. 5) are formed thereon.

Specifically, first, the nozzle plate 114 is formed on the front surface of the planarized substrate 100. The nozzle plate 114 may be formed by depositing silicon oxide or silicon nitride.

Subsequently, the heater 108 is formed on the nozzle plate 114. The heater 108 may be formed by depositing a resistive heating material, such as impurity-doped polysilicon, tantalum-aluminum alloy or tantalum nitride, on the entire surface of the nozzle plate 114 to a predetermined thickness and patterning the deposited resultant. Specifically, polysilicon may be deposited to a thickness of about 0.7-1 μm together with a source gas containing an impurity, such as phosphorous (P), by low-pressure chemical vapor deposition (LP-CVD). Tantalum-aluminum alloy or tantalum nitride may be deposited to a thickness of about 0.1-0.3 μm by sputtering. The thickness of the resistive heating material may be different, so as to have proper resistance in consideration of the width and length of the heater 108. The resistive heating material deposited on the entire surface of the nozzle plate 114 is patterned by a photolithographic process using a photomask and a photoresist and by an etch process using a photoresist pattern as an etch mask.

Next, the heater passivation layer 116 formed of silicon oxide or silicon nitride is deposited on the entire surface of the nozzle plate 114 on which the heater 108 is formed, to a thickness of about 0.5 μm. The heater passivation layer 116 deposited on the heater 108 is etched such that a portion of the heater 108 to be connected to the electrode (112 of FIG. 5) is exposed. Subsequently, metal of good conductivity that can be easily patterned, for example, aluminum or aluminum alloy, is deposited to a thickness of about 1 μm by sputtering and patterned, thereby forming the electrode (112 of FIG. 5). Then, a tetraethylorthosilane (TEOS) oxide layer is deposited on the heater passivation layer 116 in which the electrode (112 of FIG. 5) is formed, to a thickness of about 0.7-1 μm by plasma-enhanced chemical vapor deposition (PE-CVD), thereby forming the electrode passivation layer 118.

Figure 11:
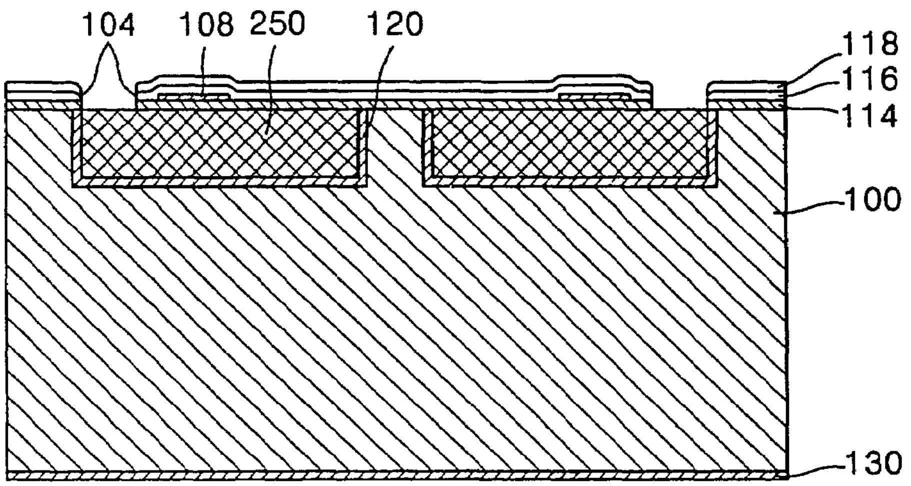

FIG. 11 illustrates a case where a nozzle 104 is formed in a nozzle plate 114. Specifically, the electrode passivation layer 118, the heater passivation layer 116, and the nozzle plate 114 are sequentially etched by a reactive ion etching (RIE) to form the nozzle 104. After formation of the nozzle 104, a part of the sacrificial layer 250 formed on the substrate 100 is exposed by the nozzle 104.

Figure 12:
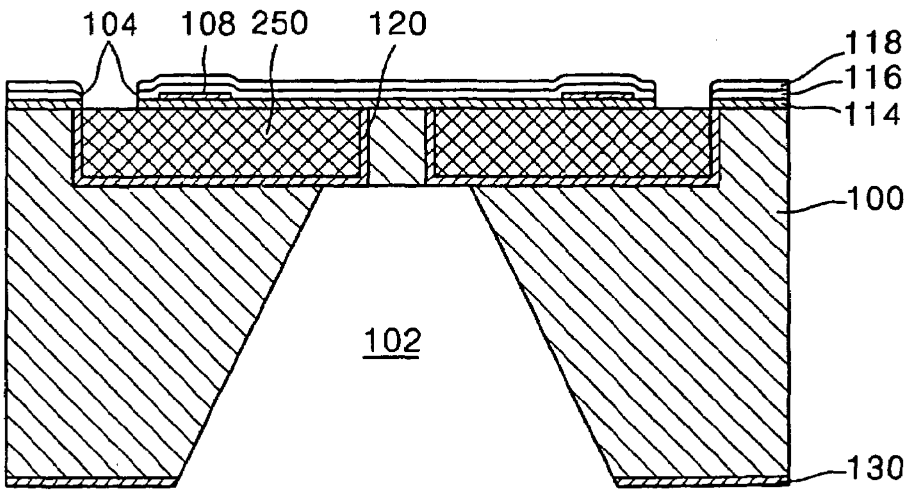

FIG. 12 illustrates a case where a manifold 102 is formed on a rear surface of a substrate. Specifically, the silicon oxide layer 130 formed on the rear surface of the silicon substrate 100 is patterned, thereby forming an etch mask that defines a region to be etched. Next, the substrate 100 exposed by the etch mask is wet or dry etched to a predetermined depth, thereby forming the manifold 102.

Figure 13:
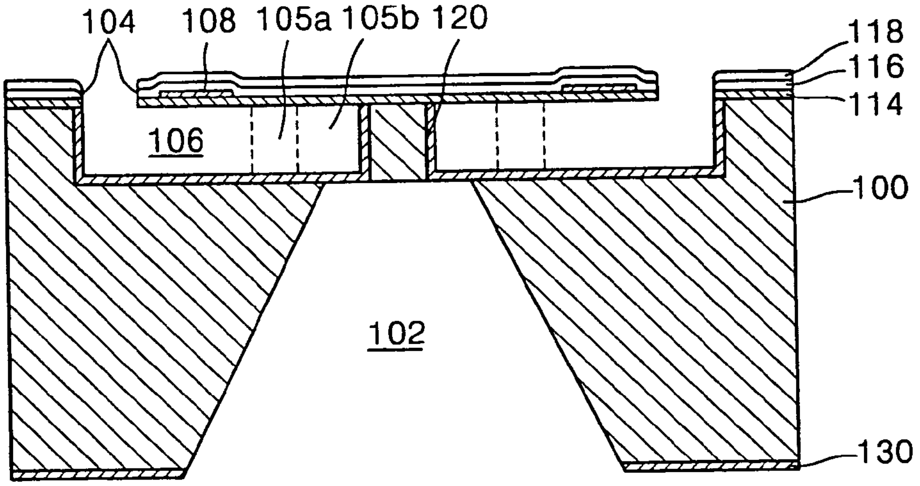

FIG. 13 illustrates a case where an ink chamber 106 and an ink passage 105 are formed on the front surface of a substrate. Specifically, when a portion of the structure exposed through the nozzle 104 is etched using an $XeF_2$ gas as an etch gas, only the sacrificial layer 250 formed of polysilicon is etched. As a result, the ink chamber 106 and the ink passage 105 are formed parallel to the front surface of the substrate 100 on the same plane. Here, the depth of the ink chamber 106 and the ink passage 105 formed on the front surface of the substrate 100 is similar to a depth of the above-described groove (150 of FIG. 8), and thus is about 40 μm. The ink passage 105 includes an ink channel 105*a* in communication with the ink chamber 106 and a feed hole 105*b* in communication with the manifold 102.

Figure 14:
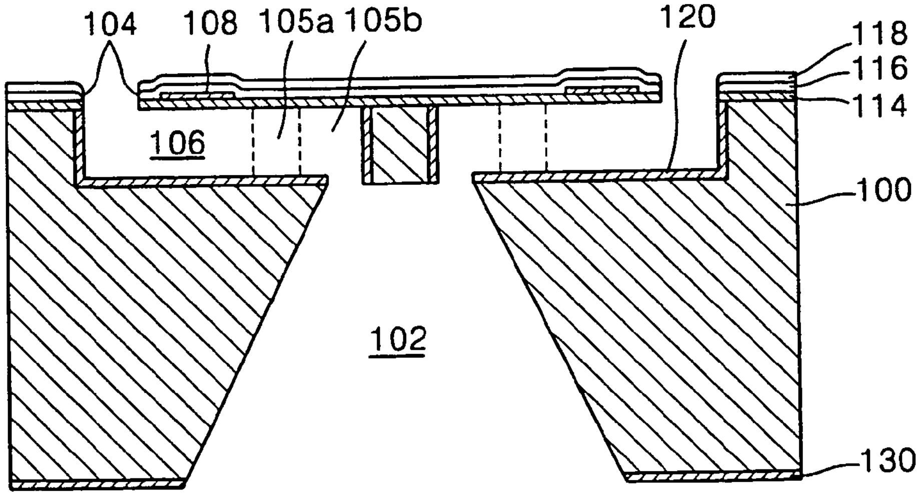

FIG. 14 illustrates a case where communication is provided between an ink passage and a manifold, which are formed on a substrate. Specifically, the silicon oxide layer 120 formed between the ink passage 105 formed on the front surface of the substrate 100 and the manifold 102 formed on the rear surface of the substrate 100 is removed by an etch process such that the ink passage 105 is in communication with the manifold 102.

Figure 15:
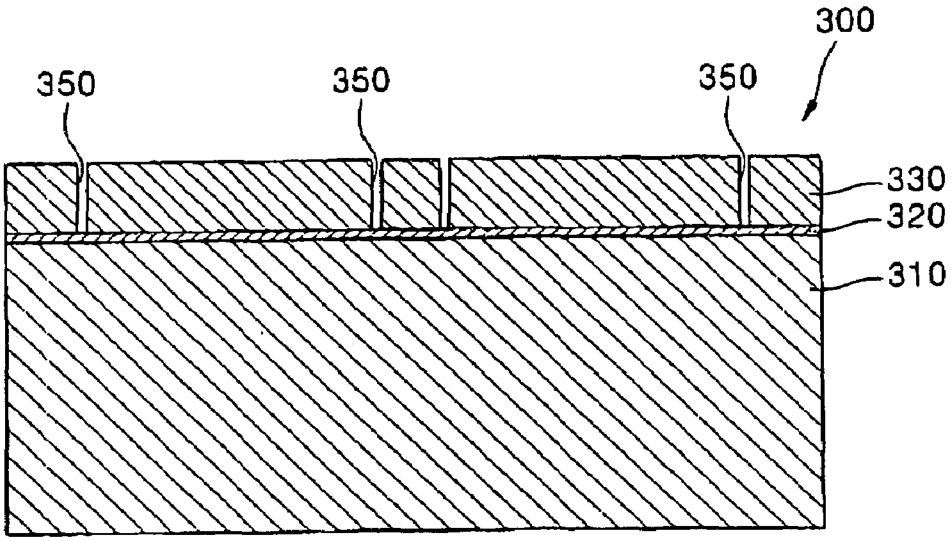
FIGS. 15 and 16 illustrates cross-sectional views of stages in an alternate method for manufacturing an ink-jet printhead according to an embodiment of the present invention.
Figure 16:
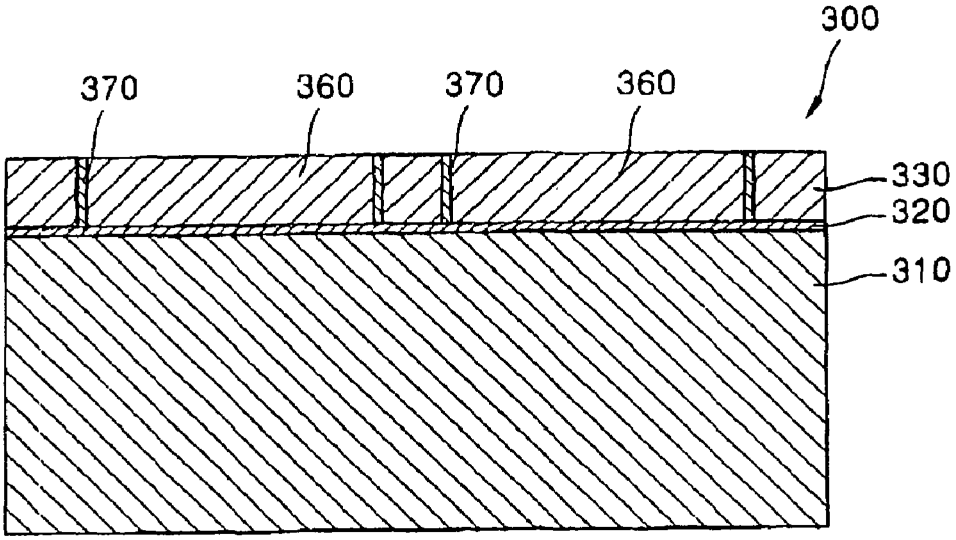

FIGS. 15 and 16 illustrate cross-sectional views of stages in an alternate method for manufacturing an ink-jet printhead according to an embodiment of the present invention. The alternate method is the same as the first-described method for manufacturing an ink-jet printhead, except with respect to the formation of the sacrificial layer. Thus, only the formation of the sacrificial layer will now be described.

First, a silicon on insulator (SOI) substrate 300 where an insulating layer 320 is interposed between two silicon substrates 310 and 330, is used as a substrate. Here, the thickness of the upper silicon substrate 330 is about 40 μm, and the thickness of the lower silicon substrate 310 is about 300-700 μm.

Next, as shown in FIG. 15, the front surface of the upper silicon substrate 330 is etched, thereby forming a trench 350 having a predetermined shape to expose the insulating layer 320. Next, as shown in FIG. 16, a silicon oxide layer 370 fills the trench 350, and the front surface of the upper silicon substrate 330 is planarized. As a result, a portion surrounded by the silicon oxide layer 370 becomes a sacrificial layer 360. Thus, the sacrificial layer 360 is formed of silicon, as opposed to polysilicon as is described in connection with the first embodiment. Next, the sacrificial layer 360 formed of silicon is etched, thereby forming the ink chamber 106 and the ink passage 105.

As described above, an ink-jet printhead according to the present invention has several advantages.

First, an ink passage is formed parallel to a front surface of a substrate on a same plane as an ink chamber, thereby preventing ejection defects caused by back flow of ink and improving the performance of a printhead.

Second, before forming a nozzle plate, the front surface of the substrate is etched to form the ink chamber and the ink passage, thereby manufacturing an ink chamber and ink passage having an optimum shape and thickness.

Third, the ink chamber, the ink passage, and a manifold are formed on a substrate, such that the ink passage can be elaborately formed and a process of manufacturing a printhead can be simplified.

A preferred embodiment of the present invention has been disclosed herein and, although specific terms are employed, they are used and are to be interpreted in a generic and descriptive sense only and not for purpose of limitation. For example, an exemplary material used in forming each element of an ink-jet printhead according to the present invention has been disclosed, and a variety of materials may be used to form elements. In addition, an exemplary method for depositing and forming each material has been disclosed, and a variety of deposition and etch methods may be applied to an ink-jet printhead. In addition, the order of each step of the method for manufacturing the ink-jet printhead may be varied. Accordingly, it will be understood by those of ordinary skill in the art that various changes in form and details may be made without departing from the spirit and scope of the present invention as set forth in the following claims.

What is claimed is:

1. A method for manufacturing an ink-jet printhead, comprising:

forming a sacrificial layer having a predetermined depth on a front surface of a substrate;

forming a nozzle plate on the front surface of the substrate on which the sacrificial layer is formed, arranging a heater and an electrode electrically connected to the heater on the nozzle plate, and exposing the sacrificial layer by forming a nozzle in the nozzle plate;

forming a manifold on a rear surface of the substrate;

forming an ink chamber and an ink passage by etching the sacrificial layer exposed through the nozzle; and providing communication between the manifold and the ink passage.

2. The method as claimed in claim 1, wherein the ink chamber and ink passage have a same depth.

3. The method as claimed in claim 1, wherein the manifold is parallel to the front surface.

4. The method as claimed in claim 1, wherein forming the manifold, forming the ink chamber and the ink passage, include etching.

5. The method as claimed in claim 1, wherein the ink passage is formed in a same plane as the ink chamber.

6. The method as claimed in claim 1, wherein forming the sacrificial layer comprises:

forming a groove having a predetermined depth by etching the front surface of the substrate;

forming an oxide layer having a predetermined thickness by oxidizing the front surface of the substrate in which the groove is formed; and filling a predetermined material in the groove formed in the oxide layer and planarizing the front surface of the substrate.

7. The method as claimed in claim 6, wherein filling the predetermined material in the groove formed in the oxide layer comprises epitaxially growing polysilicon and filling the grown polysilicon in the groove.

8. The method as claimed in claim 6, wherein providing communication between the manifold and the ink passage comprises etching the oxide layer formed between the manifold and the ink passage.

9. The method as claimed in claim 1, wherein forming the sacrificial layer comprises:

forming a trench having a predetermined depth on a silicon on insulator (SOI) substrate; and filling the trench with a predetermined material.

10. The method as claimed in claim 9, wherein the predetermined material is silicon oxide.

11. The method as claimed in claim 1, wherein forming the ink passage comprises:

forming an ink channel in communication with the ink chamber; and forming a feed hole in communication with the ink channel and the manifold.

12. The method as claimed in claim 11, wherein the ink channel has a substantially rectangular shape.

13. The method as claimed in claim 11, wherein the ink channel has at least one arc-shaped sidewall.

14. The method as claimed in claim 1, wherein the ink chamber has a length and two opposite ends spaced apart by the length and further comprising providing communication between the ink passage and the ink chamber at one of the two ends.

15. The method as claimed in claim 14, wherein forming the nozzle comprises forming the nozzle proximate to an opposite end of the ink chamber, such that the nozzle is not centered along the length.

* * * * *